Dec. 27, 1949 D. BIERMANN 2,492,615
PROPELLER HUB
Filed May 4, 1946 2 Sheets-Sheet 1
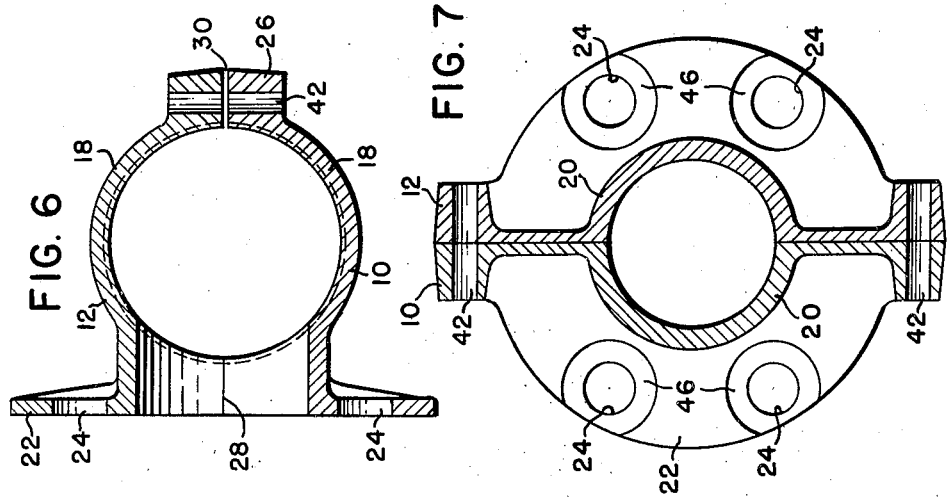
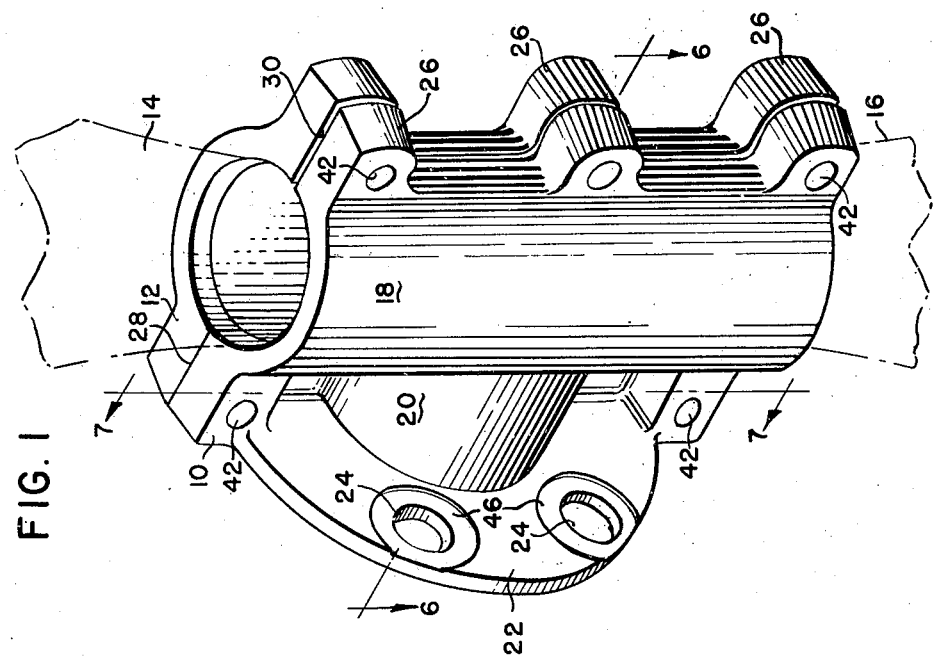
INVENTOR
DAVID BIERMANN
BY Toulmin & Toulmin
ATTORNEYS Dec. 27, 1949  D. BIERMANN  2,492,615
PROPELLER HUB
Filed May 4, 1946  2 Sheets-Sheet 2

INVENTOR
DAVID BIERMANN
BY Toulmin & Toulmin
ATTORNEYS

Patented Dec. 27, 1949

2,492,615

UNITED STATES PATENT OFFICE 2,492,615

PROPELLER HUB

David Biermann, Piqua, Ohio, assignor to Hartzell Industries, Inc., Piqua, Ohio, a corporation of Ohio Application May 4, 1946, Serial No. 667,355

4 Claims. (Cl. 170—160.61)

1

This invention relates to mountings for the hubs of flanged shafts and to methods of making the same. More particularly still, this invention relates to an improved type hub for flanged propeller blades and to a method of producing the said hub.

One type of propeller which is commonly used includes individual blades which are carried in a central hub by means of a flange on the end of the blades and a correspondingly shaped recess in the hub. Hubs of this type generally include a flange whereby the hubs can be mounted on the end of an engine crank shaft or a similar driven shaft for supplying power to the propeller. The customary method of manufacturing hubs of this type is to forge them in halves with one thereof carrying the mounting flange and the other thereof being secured thereto with the parting line of the assembled hub lying in a plane perpendicular to the axis of the drive shaft.

Hubs of this type, when employed as propeller hubs, are subject to great stresses due to the centrifugal force exerted thereon by the propeller blades when the propeller is rotating at high speeds. Accordingly, in view of the fact that it is of importance that the hub have minimum weight, it is necessary that the utmost strength of the material in the hub be realized to provide for safety in use without excessive weight.

The principal object of the present invention is to provide a hub of this type of improved design and a method of manufacturing the hub such that the greatest possible strength thereof is insured.

Another object is to provide an improved hub and method of making the same by means of which the hub is more easily manufactured.

Still another object is to provide a method of forging an airplane hub of the type referred to above which insures that the flow of metal during the forging operation will set up grain lines within the forging that give the finished workpiece maximum strength.

It is also an object to provide a split airplane propeller hub and a method of making the same such that a minimum amount of metal has to be removed from the original forging in order to produce the final workpiece.

A still further object is to provide a propeller hub of the type referred to above which is formed of identical halves, thereby reducing die expense, simplifying machining set-ups, and insuring equal strength in both halves of the hub.

These and other objects and advantages will become more apparent upon reference to the following description and the accompanying drawings in which:

Figure 1 is a view showing the halves assembled to form a complete hub;

Figure 6 is a section on the line 6—6 of Figure 1 taken through the center of the hub; and Figure 7 is a view taken on the line 7—7 of Figure 1.

Figure 2:
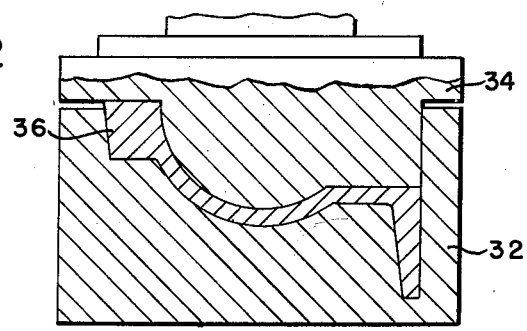
Figures 2, 3, 4 and 5 are a series of views showing the steps in the manufacture of propeller hub halves according to this invention.

Referring to the drawings, Figure 1 illustrates an assembled propeller hub with the blades which it carries shown in dot-dash outline. It will be noted that the hub is comprised of identical halves formed by dividing the hub along a plane parallel to the axis of the drive shaft and also to the axis of the propeller blades. The said halves are indicated at 10 and 12 and the blades supported thereby at 14 and 16.

Each of the halves of the hub comprises a main semi-cylindrical portion 18 which is intersected by a semi-cylindrical portion 20 on the axis of the drive shaft. The portion 20 terminates in a laterally extending flange 22 which is spot faced and drilled as at 24 for the purpose of receiving the attaching screws which secure the propeller hub to the flange at the end of the drive shaft. The cylindrical bore formed by the portions 20 may receive the end of the drive shaft for greater rigidity if desired.

The two halves of the hub are secured together by screws passing through a plurality of lugs indicated at 26 which are drilled for receiving the said screws. Preferably, the hub halves 10 and 12 abut along the parting plane adjacent the flange 22 as indicated by the reference numeral 28 and are spaced somewhat apart on the opposite side as indicated at 30. This permits the clamping screws on the side opposite the flange 22 to clamp the hub against the shouldered shanks of the propeller blades.

As mentioned, the hub is formed from identical halves which are manufactured by a series of operations including forging, machining, sand blasting and buffing steps arranged to produce maximum strength in the hub halves.

Figure 3:
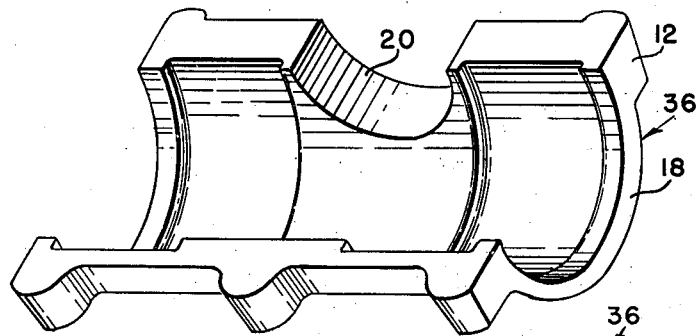
Figure 4:
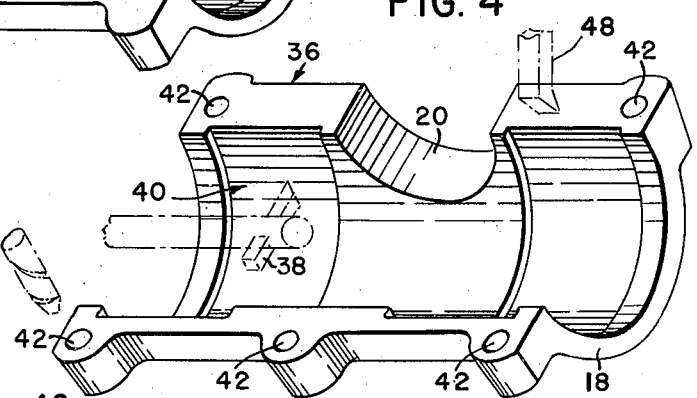
Figure 5:
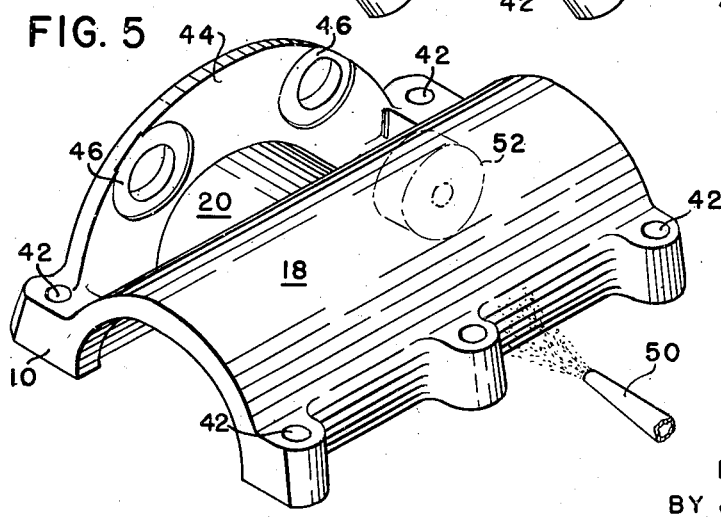

The manufacturing steps in the production of a hub half are indicated in Figures 2 through 5. In Figure 2 there is shown a simple forging operation wherein the die halves 32 and 34 are shaped for forging a hub half indicated at 36. The resulting forging is indicated in Figure 3. Reference to this figure and to Figure 5, will reveal that the forging is of relatively simple configuration, and that the flow of metal into the farthest reaches of the forging die is not so great as to rupture the grain lines in the finished forging. Rather, the flow of metal in the forging die is such that the grain lines in the forging produce maximum strength in the hub when two of the forged halves are assembled.

The relatively simple configuration of forging which results from the placing of the parting line according to this invention so simplifies the forging operation that the workpiece can be forged to finished dimensions on the outside and only enough material need be left on the inside of the hub to provide for the finished surfaces necessary to receive the flanged ends of the propeller blades and the end of the drive shaft and flange.

In Figure 4 there is diagrammatically illustrated the machining of the forging and it will be seen that a tool 38 is employed for finish shaping the inside 40 of the hub half 36 while the holes 42 for receiving the clamping bolts are drilled or bored in any suitable manner. In the machining operations exemplified by the diagrammatic illustration in Figure 4, the surface of the flange indicated by the numeral 44 in Figure 5 is also finished and the spot faced holes 46 therein are drilled or bored. Also, the surface of the hub half along the parting plane of the finished hub may be machined in any suitable manner as by the tool 48.

The amount of material removed from the inside of the hub is relatively small, possibly one-sixteenth of an inch being required for properly cleaning the surfaces required to be finished. By only removing this small amount of metal, the grain lines of the forging are left substantially unsevered and the greater portion of the metal remaining in the hub is active in providing the necessary high strength to support the propeller blades.

In Figure 5 there is an illustration of the outside of a hub half being finished. The only finish required for the outside surface is a sand blasting operation which is represented as being performed by the nozzle as at 50 and a polishing or buffing operation which is represented as being performed by the buffing wheel 52. The sanding and buffing operations produce a finished appearance on the outside of the hub, remove scale and foreign material, and eliminate any sharp edges or tiny fissures which would set up localized strains that would detract from the strength of the hub in operation.

It will be apparent that this invention provides for an improved and simplified method of forming hubs for receiving flanged shafts, particularly the ends of propeller blades, and that the resulting product has greater strength, is easier to machine, and provides for a more inexpensive final product.

It will be understood that this invention is susceptible to modification in order to adopt it to different usages and conditions and, accordingly, it is desired to comprehend such modifications within this invention as may fall within the scope of the appended claims.

I claim:

1. In a hub for connecting propeller blades with a drive shaft; a first cylindrical part having means in the ends thereof for supporting blades, a second cylindrical part intersecting said first cylindrical part between its ends and having its axis at right angles to and intersecting the axis of said first part, said hub being divided into identical halves for a parting plane which is co-planar with the axes of said cylindrical parts, said first named means including a first two pairs of shoulders on the first named cylindrical means at longitudinal opposite ends thereof, the shoulders of each pair being in spaced relation, and a second two pairs of shoulders diametrically opposite to the first two pairs at opposite longitudinal ends of the first named cylindrical means, the shoulders of each second pair being in abutting relation, a flange on the end of said second part for connection with the flanged end of the drive shaft and said second named pairs integrally connecting said flange and first cylindrical part.

2. In a hub for connecting propeller blades with a drive shaft; a first cylindrical part having means in the ends thereof for supporting blades, a second cylindrical part intersecting said first cylindrical part between its ends and having its axis at right angles to and intersecting the axis of said first part, said hub being divided into identical halves for a parting plane which is co-planar with the axes of said cylindrical parts, said first named means including a first two pairs of shoulders on the first named cylindrical means at longitudinal opposite ends thereof, the shoulders of each pair being in spaced relation, and a second two pairs of shoulders diametrically opposite to the first two pairs at opposite longitudinal ends of the first named cylindrical means, the shoulders of each second pair being in abutting relation, a flange on the end of said second part extending at right angles to said part for connection with the flanged end of the drive shaft and said second named pairs integrally connecting said flange and first cylindrical part.

3. In a hub for connecting propeller blades with a drive shaft; a first cylindrical part having means in the ends thereof for supporting blades, a second cylindrical part intersecting said first cylindrical part between its ends and having its axis at right angles to and intersecting the axis of said first part, said hub being divided into identical halves for a parting plane which is co-planar with the axes of said cylindrical parts, said first named means including a first two pairs of shoulders on the first named cylindrical means at longitudinal opposite ends thereof, the shoulders of each pair being in spaced relation, and a second two pairs of shoulders diametrically opposite to the first two pairs at opposite longitudinal ends of the first named cylindrical means, the shoulders of each second pair being in abutting relation, a flange on the end of said second part and said second named pairs integrally connecting said flange and first cylindrical part, said flange having means for connecting the same to a propeller shaft.

4. In a hub for connecting propeller blades with a drive shaft; a first cylindrical part having means in the ends thereof for supporting blades, a second cylindrical part intersecting said first cylindrical part between its ends and having its axis at right angles to and intersecting the axis of said first part, said hub being divided into identical halves for a parting plane which is co-planar with the axes of said cylindrical parts, said first named means including a first two pairs of shoulders on the first named cylindrical means at longitudinal opposite ends thereof, the shoulders of each pair being in spaced relation, and a second two pairs of shoulders diametrically opposite to the first two pairs at opposite longitudinal ends of the first named cylindrical means, the shoulders of each second pair being in abutting relation, a flange on the end of said second part and said second named pairs integrally connecting said flange and first cylindrical part, said flange having a series of apertures for securing the same to a propeller shaft.

DAVID BIERMANN.

REFERENCES CITED

The following references are of record in the file of this patent:

UNITED STATES PATENTS

| Number | Name | Date |
|---|---|---|
| 861,663 | Latshaw | July 30, 1907 |
| 1,186,222 | Murray | June 6, 1916 |
| 1,967,435 | Squires | July 24, 1934 |
| 2,027,439 | King | Jan. 14, 1936 |
| 2,088,853 | Grabarse | Aug. 3, 1937 |
| 2,317,629 | McCauley | Apr. 27, 1943 |
| 2,450,660 | Hardy | Oct. 5, 1948 |

FOREIGN PATENTS

| Number | Country | Date |
|---|---|---|
| 13,961 | France | Aug. 18, 1911 |
|  | (addition to Pat. No. 423,441) | |
| 423,441 | France | Feb. 16, 1911 |